United States Patent
Earnest (10) Patent No.: US 6,226,338 B1
(45) Date of Patent: May 1, 2001

(54) MULTIPLE CHANNEL DATA COMMUNICATION BUFFER WITH SINGLE TRANSMIT AND RECEIVE MEMORIES

(75) Inventor: Timothy J. Earnest, Vadnais Heights, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/099,563

(22) Filed: Jun. 18, 1998

(51) Int. Cl.[7] .............................. H04L 7/00; H04L 25/00; H04L 25/40

(52) U.S. Cl. .............................. 375/372; 710/26; 710/56; 365/189.05; 369/49

(58) Field of Search .............................. 375/372; 710/22, 710/23, 26, 52, 54, 56; 711/1, 3, 100; 333/1; 365/189.01, 189.05; 369/47, 40, 49; 370/378, 379

(56) References Cited

U.S. PATENT DOCUMENTS 5,363,485 * 11/1994 Nguyen et al. ...................... 713/600
5,450,547 * 9/1995 Nguyen et al. ...................... 710/113
5,831,393 * 11/1998 Hohenstein et al. ................. 714/52
5,850,258 * 12/1998 Kang ................................... 348/390

* cited by examiner

Primary Examiner—Stephen Chin
Assistant Examiner—Lenny Jiang
(74) Attorney, Agent, or Firm—Westman, Champlin & Kelly, P.A.

(57) ABSTRACT

A multiple-channel data communication buffer includes a transmit first-in-first-out ("FIFO") circuit and a receive FIFO circuit. The transmit and receive FIFO circuits each include a write pointer array, a read pointer array and a single memory device having a data input, a data output, a write address input, a read address input and a plurality of logical channels from the data input to the data output. The write pointer array has a write pointer for each of the logical channels and applies a selected one of the write pointers to the write address input based on a write channel number input. The read pointer array has a read pointer for each of the logical channels and applies a selected one of the read pointers to the read address input based on a read channel number input.

10 Claims, 6 Drawing Sheets

MULTIPLE CHANNEL DATA COMMUNICATION BUFFER WITH SINGLE TRANSMIT AND RECEIVE MEMORIES

BACKGROUND OF THE INVENTION

The present invention relates to integrated circuits for data communication systems such as network devices and telecommunications circuits. More particularly, the present invention relates to a multiple channel data buffer for use in an integrated circuit.

Data communication circuits such as network devices and telecommunication circuits typically have several communication channels for connecting to multiple devices such as workstations, telephone and television systems, video teleconferencing systems and other facilities over common data links or carriers. A channel is a logical path from one source to one destination and can be unidirectional or bidirectional. A data routing circuit, such as a direct memory access (DMA) controller, routes data to and from each channel. Each channel includes a data interface controller, such as a serial wide area network (SWAN) controller or a local area network (LAN) controller. Each data interface controller is coupled to the data routing circuit for controlling transmission of its respective data over the data link or carrier.

Data interface controllers are often configured to transmit packets of data having an arbitrary length at a fixed speed. For example, a WAN controller may transmit an Internet Protocol (IP) packet over a fixed speed Interactive Services Digital Network (ISDN) Basic Rate Interface (BRI) using high level data link control (HDLC) framing. Alternatively, a LAN controller such as an Ethernet controller may transmit an IP packet over a fixed speed 10 or 100 Mbps LAN.

In these applications, it is common to use a first-in-first-out (FIFO) memory for buffering transmit and receive data between the DMA controller and each data interface controller. Each communication channel has its own transmit FIFO and its own receive FIFO. Each FIFO uses a dual port random access memory (RAM) for storing the data. One port is used by the data interface controller and the other port is used by the data routing circuit. During a transmit operation, the DMA controller writes the data packets to one end of the FIFO at a DMA transmission rate, and the data interface controller reads the packets at the other end of the FIFO at the rate of the fixed speed data interface.

The FIFO is needed because the DMA transmission rate is generally substantially higher on average than the rate of the fixed speed data interface. Also, the DMA controller is subject to "gaps" in its ability to feed the FIFO because of memory access latencies, contention with other master devices that are coupled to the memory bus and control logic overhead.

The use of multiple transmit FIFOs and multiple receive FIFOs has several disadvantages. For example, each FIFO must have its own address decode logic for writing into the FIFO and reading out of the FIFO. The requirement for multiple address decode logic circuits adds to the number of semiconductor devices or "gates" on the integrated circuit and requires more interconnections to be routed between the gates on the integrated circuit. Each FIFO must also have its own logic for maintaining status flags related to the number of data entries stored in the FIFO, such as an "almost empty" flag and an "almost full" flag. This also adds to the number of gates and interconnections on the integrated circuit. In addition, since each FIFO is a separate module on the integrated circuit, there are more interconnections that must be routed between each FIFO and its source and destination. Improved data communication buffer circuits are desired.

SUMMARY OF THE INVENTION

The multiple-channel data communication buffer of the present invention includes a transmit first-in-first-out ("FIFO") circuit and a receive FIFO circuit. The transmit and receive FIFO circuits each include a write pointer array, a read pointer array and a single memory device having a data input, a data output, a write address input, a read address input and a plurality of logical channels from the data input to the data output. The write pointer array has a write pointer for each of the logical channels and applies a selected one of the write pointers to the write address input based on a write channel number input. The read pointer array has a read pointer for each of the logical channels and applies a selected one of the read pointers to the read address input based on a read channel number input.

DETAILED DESCRIPTION OF THE PREFERRED EMBODIMENTS

Figure 1:
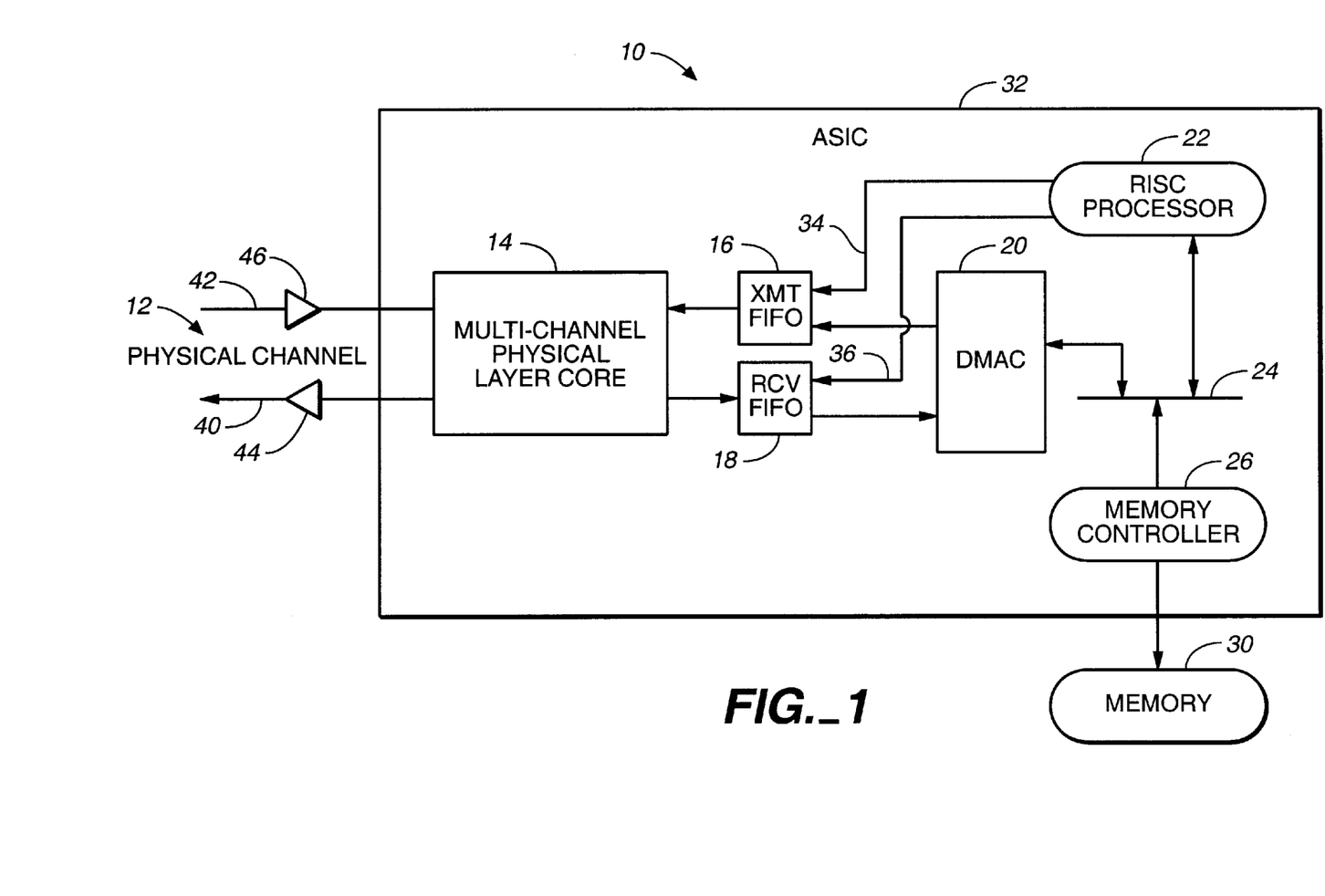
FIG. 1 is a block diagram of a data communication circuit according to one embodiment of the present invention.

FIG. 1 is a block diagram of a data communication circuit according to one embodiment of the present invention. Data communication circuit 10 includes physical channel 12, multiple channel physical layer core 14, transmit first-in-first-out (FIFO) buffer 16, receive FIFO buffer 18, direct memory access (DMA) controller 20, processor 22, system bus 24, memory controller 26 and memory 30. In one embodiment, multiple channel physical layer core 14, transmit and receive FIFOs 16 and 18, DMA controller 20, processor 22, system bus 24 and memory controller 26 are all fabricated on a single semiconductor integrated circuit 32, such as an application specific integrated circuit (ASIC).

Physical channel 12 includes a transmit data link or carrier 40 and a receive data link or carrier 42 which are coupled to Physical Layer (PHY) devices 44 and 46, respectively, for interfacing with transmit and receive data links 40 and 42. In one embodiment, physical channel 12 includes an ISDN line or frame relay (T1/E1 or fractional T1/E1) line, for example.

Core 14 includes a data interface controller for controlling data communication from DMA controller 20 to physical channel 12 along multiple logical channels. The data interface controller includes a time division multiplexer (TDM) which multiplexes the data transfers within each logical channel with the data transfers within the other logical channels over physical channel 12. In one embodiment, core 14 supports up to 32 time division multiplexed channels.

Core 14 is coupled to DMA controller 20 through transmit FIFO 16 and receive FIFO 18. Transmit FIFO 16 and receive FIFO 18 each include a single random access memory (RAM) device for buffering data between core 14 and DMA controller 20. The memory locations within each RAM device are divided into blocks, or "queues", with one queue being associated with a corresponding one of the logical channels. Transmit FIFO 16 and receive FIFO 18 further include queue parameter inputs 34 and 36, respectively, for receiving programmable queue parameters from processor 22. The programmable queue parameters allow processor 22 to configure transmit FIFO 16 and receive FIFO 18 to have selected number of logical channels and a selected number of memory locations in each channel. Processor 22 can change the queue parameters and thus the number of channels supported by FIFOs 16 and 18 to suit a particular application. In one embodiment, FIFOs 16 and 18 can be programmed to include 32, 16, 8 or 4 logical channels, with each channel having 64, 128, 256 or 512 memory locations, respectively.

DMA controller 20 is coupled to processor 22 and memory controller 26 over system bus 24. DMA controller 20 arbitrates for access to system bus 24 with processor 22. Memory controller 26 is coupled between system bus 24 and external memory 30 for controlling data transfers to and from memory 30 by DMA controller 20 and processor 22. Memory controller 26 can be located on integrated circuit 32 or can be a separate module from integrated circuit 32.

DMA controller 20 operates as a data routing circuit, under the control of processor 22, which routes transmit data in multiple-bit data frames or packets from external memory 30 to one of the logical channels in transmit FIFO 16. DMA controller 20 also routes receive data from one of the logical channels in receive FIFO 18 to external memory 30, to another device coupled to system bus 24, or to one of the logical channels within transmit FIFO 18. When there is data to be transferred, DMA controller 20 transfers each data frame a byte or word at a time until the entire data frame has been transferred. DMA controller 20 notifies processor 22 only when the data transfer of the entire data frame is complete. Data routing circuits other than a DMA controller, such as a processor, can also be used in alternative embodiments of the present invention.

During a transmit operation, processor 22 notifies DMA controller 20 that there is a data frame in memory 30 to be transferred through a selected logical channel. DMA controller 20 passes successive words or bytes of the data frame from memory 30, through memory controller 26 to successive entries within the queue that corresponds to the selected logical channel within transmit FIFO 16. DMA controller 20 continues to pass each successive word or byte of the data frame until the entire data frame has been transmitted, the queue in transmit FIFO 16 is full or another logical channel in transmit FIFO 16 having a higher priority requests service by DMA controller 20.

When a sufficient amount of data is in the queue for the selected logical channel in transmit FIFO 16, the data interface controller in core 14 begins retrieving the stored words or bytes at a constant rate, beginning with the first word or byte that was passed by DMA controller 20 until the entire data frame has been extracted from transmit FIFO 16. The data interface controller within core 14 adds any necessary header information such as address and control information to the data, frames the header and data according to the selected protocol and then transmits the framed header and data through physical channel 12.

Transmit FIFO 16 is needed because the rate that DMA controller 20 feeds each logical channel in transmit FIFO 16 is different on average then the fixed rate at which the data interface controller within core 14 retrieves data from each logical channel in transmit FIFO 16. Also, DMA controller 20 is subject to "gaps" in its ability to feed individual logical channels in transmit FIFO 16 because of access latencies of memory 30, contention on system bus 24 with other bus masters such as processor 22, service of other logical channels in transmit FIFO 16 and control logic overhead.

During a receive operation, a multiple-bit data frame is received by core 14 within a selected logical channel over physical channel 12. The data interface controller within core 14 receives the data frame and passes successive words or bytes of the data frame to successive entries in the queue that corresponds to the selected logical channel within receive FIFO 18 until the entire data frame has been stored. DMA controller 20 begins retrieving the words or bytes from receive FIFO 18 and stores the words or bytes in memory 30 until the entire data frame has been extracted from receive FIFO 18. DMA controller 20 then notifies processor 22 that the data transfer is complete. Alternatively, DMA controller 20 may route the received data frame to another device coupled to system bus 24 or to one of the logical channels in transmit FIFO 16.

Processor 22 can include an on-chip Reduced Instruction Set (RISC™) processor, such a MIPS CW4011 MiniRISC™ Superscalar Processor Core available from LSI Logic Corporation. Alternatively, processor 22 can also include an off-chip processor, such as an i486 or i960 microprocessor manufactured by Intel Corporation. Other processors can also be used. Memory 30 can include a variety of memory types, such as a dynamic random access memory (DRAM), a static RAM or a flash memory, for example.

The data communication circuit shown in FIG. 1 uses a single memory device for all logical channels in transmit FIFO 16 and a single memory device for all logical channels in receive FIFO 18. This minimizes the area required for implementing the data buffer function on integrated circuit 32. Additionally, by implementing queue parameter inputs 34 and 26, the user of integrated circuit 32 can partition transmit FIFO 16 and receive FIFO 18 differently when applications require a different number of logical channels. For example, one application may require a large number of channels that transfer data at a slow rate. In this application, each logical channel would require only a small number of locations to store the data. Another application may require a small number of logical channels that transfer data at a much faster rate. In this application, each logical channel would require a much larger number of locations to store the data in order to maintain the faster data rate.

Figure 2:
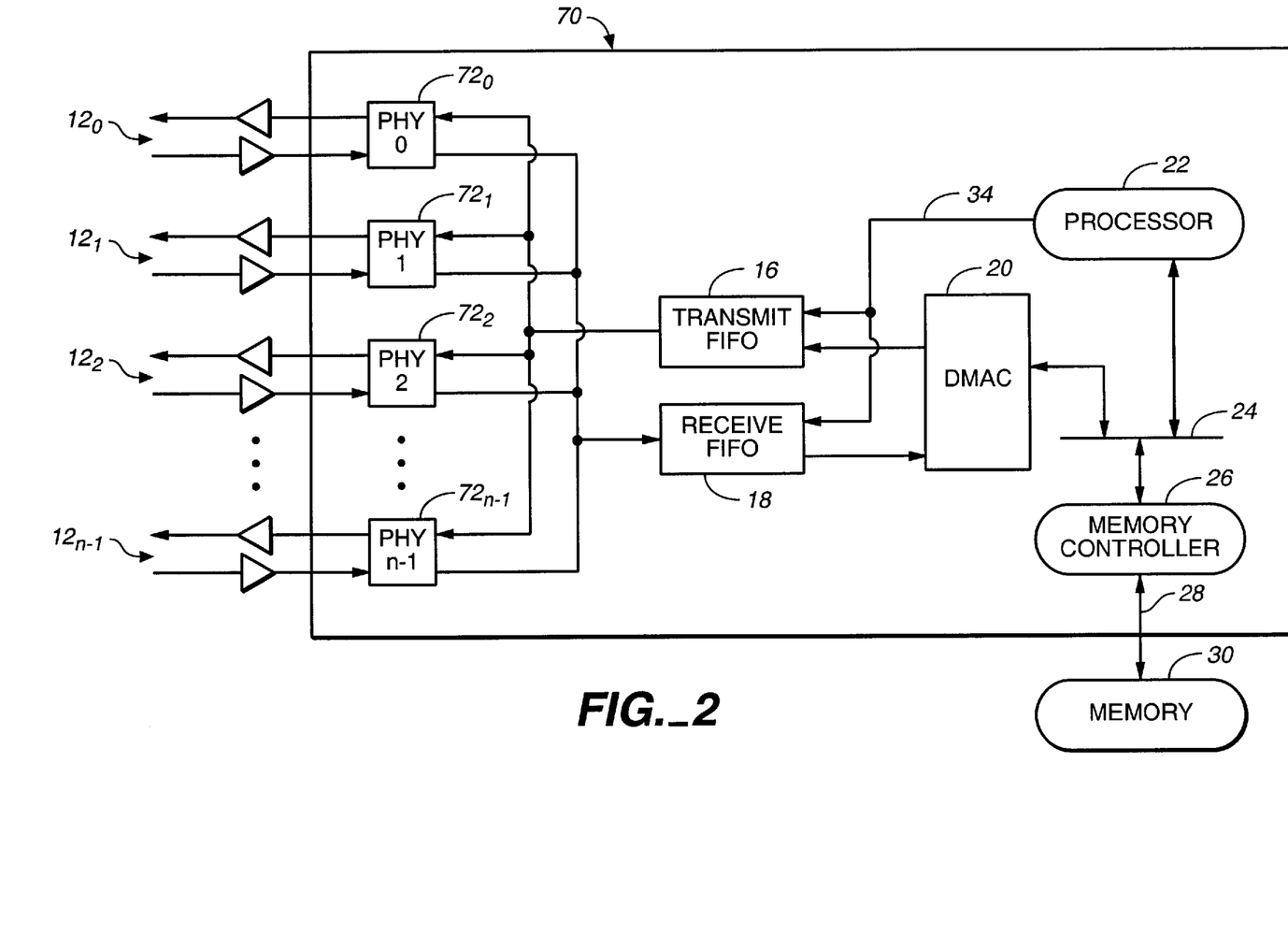
FIG. 2 is a block diagram of a data communication circuit according to another embodiment of the present invention.

FIG. 2 is a block diagram of a data communication circuit 70 according to an alternative embodiment of the present invention. The same reference numerals are used in FIG. 2 as were used in FIG. 1 for the same or similar elements. Data communication interface circuit 70 is configured to coupled to a plurality of physical channels, labeled $12_0$–$12_{N-1}$, where N is an integer greater than one. Data communication interface circuit 70 includes a plurality physical of data interface controllers $72_0$–$72_{N-1}$ which are coupled between physical channels $12_0$–$12_{N-1}$, respectively, and FIFOs 16 and 18. Each data interface controller $72_0$–$72_{N-1}$ reads data from a selected one of the logical channels within transmit FIFO 16 and writes data to the selected logical channel within receive FIFO 18. In another alternative embodiment, several logical channels can be time division multiplexed through one or more of data interface $72_N$–$72_{N-1}$ controllers.

Data interface controllers $72_0$–$72_{N-1}$ are labeled "PHY 0"–"PHY N-1" and can each include a Physical Layer device, for example, which interfaces with its respective physical channel $12_0$–$12_{N-1}$. For example, data interface controllers $72_0$–$72_{N-1}$ can include serial wide area network (SWAN) controllers or local area network (LAN) controllers. These controllers can be configured to implement a desired protocol such as Ethernet, Frame Relay (T1/E1 or fractional T1/E1), ISDN basic rate interface (BRI), asynchronous transfer mode (ATM), ADSL and high level data link control (HDLC). Other types of data interface controllers or circuits can also be used.

Figure 3:
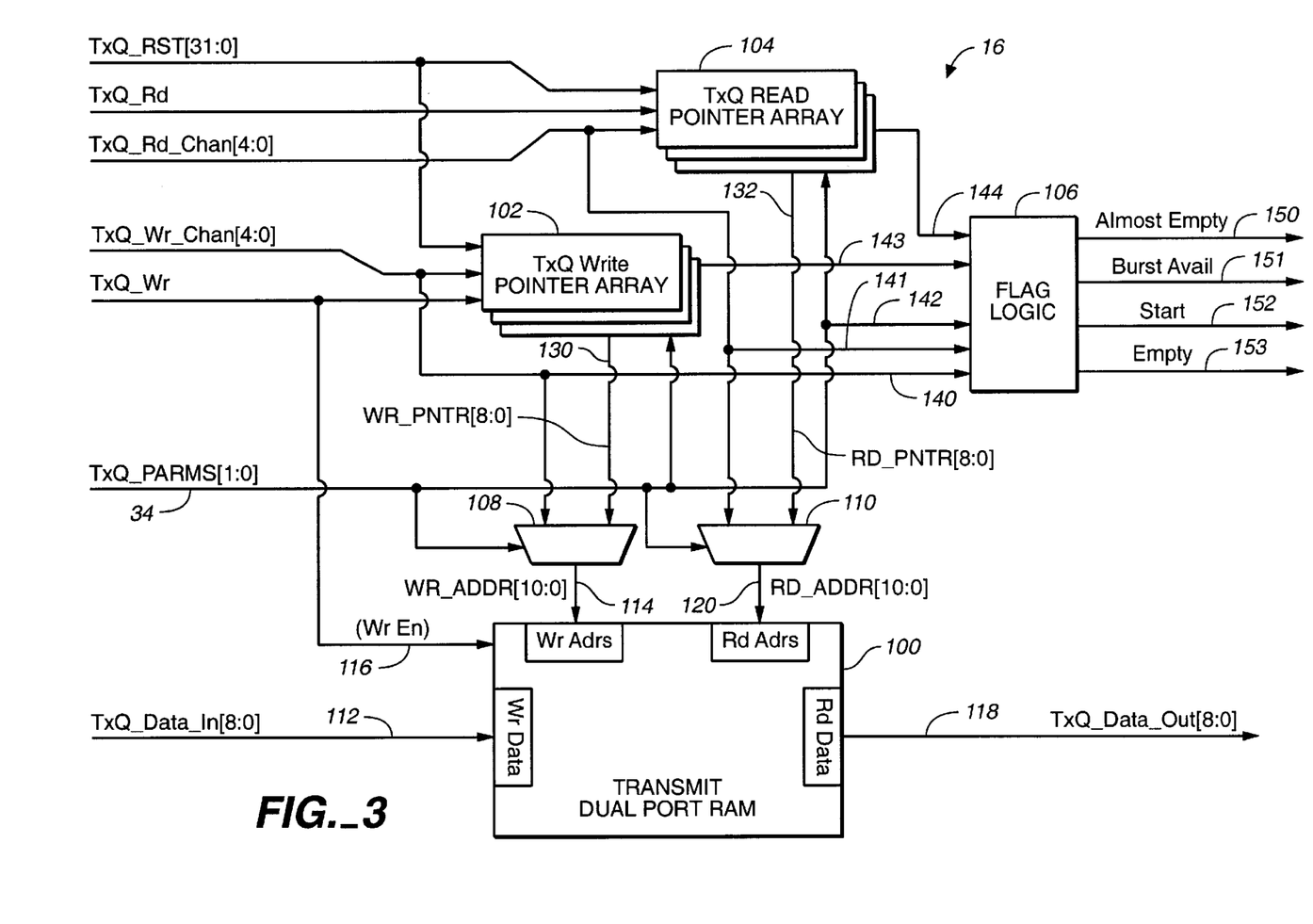
FIG. 3 is a block diagram of a transmit FIFO within the data communication circuits shown in FIGS. 1 and 2.

FIG. 3 is a block diagram showing transmit FIFO 16 in greater detail. Transmit FIFO 16 includes transmit RAM 100, write pointer array 102, read pointer array 104, flag logic 106 and address multiplexers 108 and 110. In one embodiment, RAM 100 includes a single synchronous 9-bit by 2048 entry dual port RAM having a write data input 112, a write address input 114, a write enable input 116, a read data output 118 and a read address input 120. RAM 100 is capable of simultaneous read and write operations. However, the same entry cannot be written to and read from at the same time.

Data input 112 is coupled to transmit data input TxQ_DATA_IN[8:0] for receiving successive 8-bit data words and a one-bit end of frame (EOF) flag from DMA controller 20 (shown in FIG. 1). The designation "TxQ" indicates the signal is a transmit queue signal. Bit 7 is the most significant bit of the data word, and bit 0 is the least significant bit of the data word. Bit 8 is the EOF flag. DMA controller 20 asserts bit 8 to a logic high level when the data on bits 7–0 contain the last byte of a transmit data frame. In some applications of the present invention, the EOF bit is not required.

Write enable input 116 is coupled to transmit queue write enable input TxQ_WR which is also provided by DMA controller 20. DMA controller 20 asserts this input to a logic high level when the DMA controller writes a data word to RAM 100. DMA controller 20 deasserts this input to a logic low level when the DMA controller is not writing. An absolute write address is applied to write address input 114 by multiplexer 108. When DMA controller 20 asserts TxQ_WR, RAM 100 captures the data provided on TxQ_DATA_IN[8:0] and stores the data in the address location identified by the absolute write address applied to write address input 114.

Read data output 118 is coupled to TxQ_DATA_OUT[8:0] for providing successive 8-bit data words and the corresponding EOF flag to multiple channel physical layer core 14 shown in FIG. 1 (or one of the data interface controllers shown in FIG. 2) for transmission within the selected logical channel. Bit 7 is the most significant bit of the data word, and bit 0 is the least significant bit of the data word. Bit 8 is the EOF flag. RAM 100 asserts bit 8 to a logic high level when the data on bits 7–0 contain the last byte of a transmit data frame. An absolute read address is applied to read address input 120 by multiplexer 110. RAM 100 applies the data stored in the address location identified by the absolute read address to read data output 118.

Write pointer array 102, read pointer array 104 and multiplexers 108 and 110 generate the write and read addresses for RAM 100 based on signals received from DMA controller 20 and from core 14 shown in FIG. 1 (or the data interface controllers shown in FIG. 2). Write pointer array 102 maintains a write address pointer for each logical channel within RAM 100. These write pointers can be referred to as WR_PNTR_0[8:0] for channel 0, WR_PNTR_1[8:0] for channel 1, and so on. Similarly, read pointer array 104 maintains a read pointer for each logical channel in RAM 100. These read pointers can be referred to as RD_PNTR_0[8:0] for channel 0, RD_PNTR_1[8:0] for channel 1, and so on.

Transmit queue write pointer array 102 is coupled to reset input TxQ_RST[31:0], transmit queue write channel input TXQ_WR_CHAN[4:0] and transmit queue write enable input TxQ_WR. Each write pointer maintained by write pointer array 102 points to the address of the next entry to be written into the respective queue within RAM 100 for that logical channel. Write pointer array 102 has a write pointer output 130 which is coupled to address multiplexer 108 and to flag logic 106. In one embodiment, each write pointer has nine bits.

To write an entry into RAM 100, DMA controller 20 provides a channel number on transmit queue write channel input TxQ_WR_CHAN[4:0] and provides a pulse on TXQ_WR. Write pointer array 102 selects one of the write pointers based on the channel number received on TxQ_WR_CHAN[4:0] and applies that write pointer to write pointer output 130 as WR PNTR[8:0]. Multiplexer 108 combines selected bits of the write pointer applied to write pointer output 130 with selected bits of the channel number provided on TxQ_WR_CHAN[4:0] to form the absolute write address WR_ADDR[10:0] for RAM 100. The absolute write address is applied to write address input 114. When DMA controller 20 activates TxQ_WR, RAM 100 captures the data provided on TxQ_DATA_IN[8:0] and stores the captured data in the address location identified by the absolute write address applied to write address input 114. Write pointer array 102 then increments the selected write pointer by one at the end of the write cycle as DMA controller 20 deactivates Tx_Q_WR.

Similarly, read pointer array 104 maintains a read pointer for each logical channel. Each read pointer points to the address of the next entry to be read from the respective queue within RAM 100 for that logical channel. To read an entry from one of the logical channels in RAM 100, multiple channel physical layer core 14 shown in FIG. 1 (or one of the data interface controllers shown in FIG. 2) provides the number of the logical channel to be read on transmit read channel input TxQ_RD_CHAN[4:0] and asserts TxQ_RD to a logic high state. Read pointer array 104 selects one of the read pointers based on the channel number provided on TxQ_RD_CHAN[4:0] and applies that read pointer to read pointer output 132 as RD PNTR[8:0]. Multiplexer 110 combines selected bits of RD_PNTR[8:0] with selected bits of TXQ_RD_CHAN[4:0] to form the absolute read address RD_ADDR[10:0] for RAM 100. The absolute read address is applied to read address input 120. RAM 100 applies the data stored in the address location identified by RD_ADDR[10:0] to read data output 118. When multiple channel physical layer core 14 (or one of the data interface controllers shown in FIG. 2) has captured the data on TxQ_DATA_OUT [8:0], TxQ_RD is deactivated. Read pointer array 104 then increments the selected read pointer at the end of the read cycle.

Transmit queue parameter input TxQ_PARMS[1:0] is coupled to processor 22 as shown in FIGS. 1 and 2. Processor 22 can vary the number and size of the logical channels within RAM 100 and addressed by pointer arrays 102 and 104 by varying the logical pattern formed by TxQ_PARMS[1:0]. The following table shows the number of channels and the number of entries per channel for each bit combination of TxQ_PARMS[1:0] according to one example of the present invention.

TABLE 1

| TxQ_PARMS [1:0] | Number of Channels | Entries per Channel (Bytes) |
|---|---|---|
| 0b00 | 4 | 512 |
| 0b01 | 8 | 256 |
| 0b10 | 16 | 128 |
| 0b11 | 32 | 64 |

The designation "0b" indicates a binary value. In this example, RAM 100 has a maximum of 32 logical channels with 64 bytes per channel and a minimum of four logical channels with 512 bytes per channel based on the binary combination formed by TxQ_PARMS[1:0].

Write pointer array 102 and read pointer array 104 use TxQ_PARMS[1:0] to select how many write and read pointers will be maintained and to select the number of address bits required to index through the selected number of bytes per channel. Each write and read pointer is incremented through these bits only. For example, with 32 channels and 64 bytes per channel, pointer arrays 102 and 104 maintain 32 write pointers and 32 read pointers, and each write and read pointer has six bits. With four channels and 512 bytes per channel, pointer arrays 102 and 104 maintain four write pointers and four read pointers, and each write and read pointer has nine bits.

Figure 4:
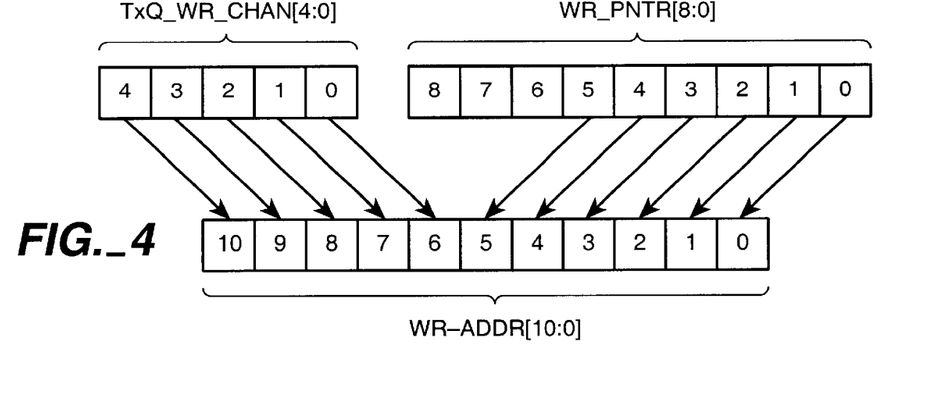
FIG. 4 is a diagram illustrating an example of the function of an address multiplexer within the transmit FIFO shown in FIG. 3.

TxQ_PARMS[1:0] is also coupled to the select inputs of multiplexers 108 and 110. FIG. 4 is diagram illustrating the function performed by multiplexer 108 for an application in which there are 32 logical channels, with 64 bytes per channel. Since six pointer bits are required to address the 64 bytes per channel, multiplexer 108 selects the first six least significant bits WR_PNTR[5:0] of the write pointer as the first six least significant bits WR_ADDR[5:0] of the absolute write address WR_ADDR[10:0]. Since five bits are required to address 32 different logical channels, multiplexer 108 selects all five bits TxQ_WR_CHAN[4:0] of the write channel number as the five most significant bits WR_ADDR[10:6] of the absolute write address WR_ADDR[10:0]. The five most significant bits of WR_ADDR[10:0] are used to select one of 32 different address blocks or "queues" within RAM 100 which corresponds to the 32 different logical channels. The six least significant bits of WR_ADDR[10:0] are used to index through the 64 entries within the address block that is selected by the channel number.

Figure 5:
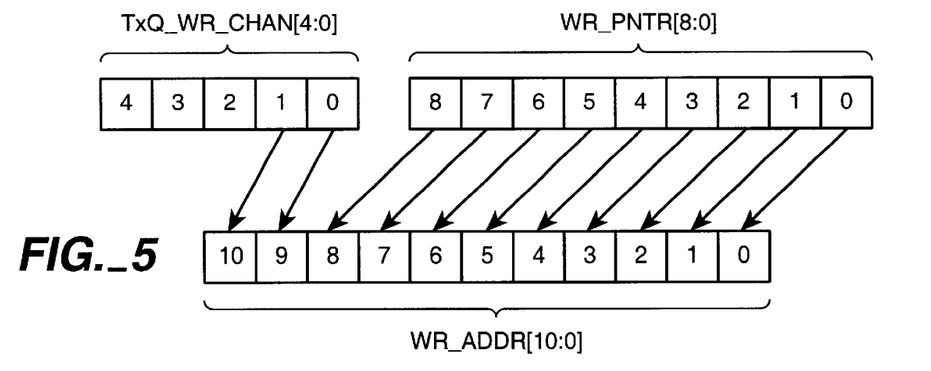
FIG. 5 is a diagram illustrating another example of the function of the address multiplexer within the transmit FIFO shown in FIG. 3.

FIG. 5 is a diagram illustrating the function of multiplexer 108 when TxQ_PARMS[1:0] equals "00" such that there are four logical channels with 512 bytes per channel. Multiplexer 108 selects all nine bits of WR_PNTR[8:0] to form the least significant nine bits WR_ADDR[8:0] of the absolute write address WR_ADDR[10:0]. Multiplexer 108 selects the two least significant bits TxQ_WR_CHAN[1:0] of the write channel number to form the two most significant bits WR_ADDR[10:9] of the absolute write address WR_ADDR[10:0].

Referring back to FIG. 3, read address multiplexer 110 operates substantially similar to write address multiplexer 108. Multiplexers 108 and 110 thus allow the number of channels and the number of storage locations per channel to be programmable through queue parameter input TxQ_PARMS[1:0].

Flag logic 106 is shared among all logical channels maintained by transmit FIFO 16. Flag logic 106 includes a write channel input 140 which is coupled to TxQ_WR_CHAN[4:0], a read channel input 141 which is coupled to TxQ_RD_CHAN[4:0], a parameter input 142 which is coupled to TxQ_PARMS[1:0], a write pointer input 143 which is coupled to write pointer array 102 and a read pointer input 144 which is coupled to read pointer array 104. Flag logic 106 generates a plurality of status flags on outputs 150–153 which are based on a comparison of the write and read pointers selected by the write and read channel numbers. Only one set of status flags are maintained by flag logic 106. When the write or read channel numbers change, the appropriate status flags are changed accordingly to reflect the new pointer comparison. Hence, the status flags are valid only for the currently selected channel number.

Flag logic 106 generates an "ALMOST EMPTY" flag on output 150 which is provided to DMA controller 20. Flag logic 106 asserts the "ALMOST EMPTY" flag to a logic high level to inform DMA controller 20 that the queue in RAM 100 for the channel selected by TxQ_WR CHAN [4:0] is almost empty. In one embodiment, flag logic 106 asserts the "ALMOST EMPTY" flag when there are 16 or fewer bytes stored in RAM 100 within the selected write channel (e.g. WR_PNTR_0[8:0]–RD_PNTR_0[8:0]<= 16 for write channel 0). Otherwise flag logic 106 deasserts the "ALMOST EMPTY" flag to a logic low level. This flag indicates to DMA controller 20 that the queue for the currently selected write channel is getting near empty so the DMA controller should increase the priority of getting data to this write channel so that the queue does not go completely empty.

Flag logic 106 generates a "BURST AVAIL" flag on output 151. Flag logic 106 asserts this flag to a logic high level to inform DMA controller 20 that the transmit queue for the currently selected channel has 32 or more bytes free, for example, in the selected write channel queue within RAM 100 (e.g. WR_PNTR_0[8:0]–RD_PNTR_0[8:0]<= 16 for write channel 0). Otherwise, flag logic 106 deasserts this flag to logic low level. The "BURST AVAIL" flag is an indication that the transmit queue within RAM 100 for the currently selected channel has room to accommodate at least one data burst from DMA controller 20. The size of each burst can be 16 or 32 bytes in length, for example.

Flag logic 106 generates a "START" flag on output 152. This flag is provided to multiple channel physical layer core 14 which is shown in FIG. 1 (or to the corresponding data interface controller 72 which is shown in FIG. 2) to indicate that a sufficient amount of data is stored within the queue for the read channel identified by TxQ_RD_CHAN[4:0] for the device to begin extracting the data from the queue at a constant rate. Alternatively, flag logic 106 asserts the START flag to a logic high level when the end of at least one data frame, as indicated by the EOF bit, is stored in the queue. In one embodiment, the threshold at which flag logic 106 asserts the START flag is set to eight bytes (i.e. WR_PNTR_0[8:0]–RD_PNTR_0[8:0]>=8 for read channel 0). The optimum threshold at which data is extracted from RAM 100 depends on system design aspects such as memory bandwidth and latency.

Flag logic 106 generates an "EMPTY" flag on output 153 which is asserted to a logic high level when there is no data stored in the queue for the currently selected write channel within RAM 100 (e.g. WR_PNTR_0[8:0]–RD_PNTR_0 [8:0]=0 for write channel 0), such that the data on TxQ_DATA_OUT[8:0] is invalid. This flag is applied to multiple channel physical layer core 14 shown in FIG. 1 or to the corresponding data interface controller 72 shown in FIG. 2.

Since some queue status flags are used only by DMA controller 20 during queue writes, flag logic 106 uses the write pointer and read pointer for the channel indicated by the write channel number when generating these flags. Since other queue status flags are used only by multiple channel physical layer core 14 (or the data interface controllers 72) during queue reads, flag logic 106 uses the write pointer and read pointer for the channel indicated by the read channel number when generating these flags.

Transmit queue reset input TxQ_RST[31:0] is coupled to write pointer array 102 and read pointer array 104. There is one bit in TxQ_RST[31:0] for each logical channel in transmit FIFO 16. Bit 0 corresponds to channel 0, bit 1 corresponds to channel 1, and so on. DMA controller 20 asserts each bit in TxQ_RST[31:0] to a logic high level for each logical channel that is enabled by processor 22. DMA controller 20 deasserts each bit in TxQ_RST[31:0] that corresponds to a logical channel that is disabled by processor 22. If a particular bit is asserted, the corresponding write pointer and read pointer in arrays 102 and 104 are reset.

Figure 6:
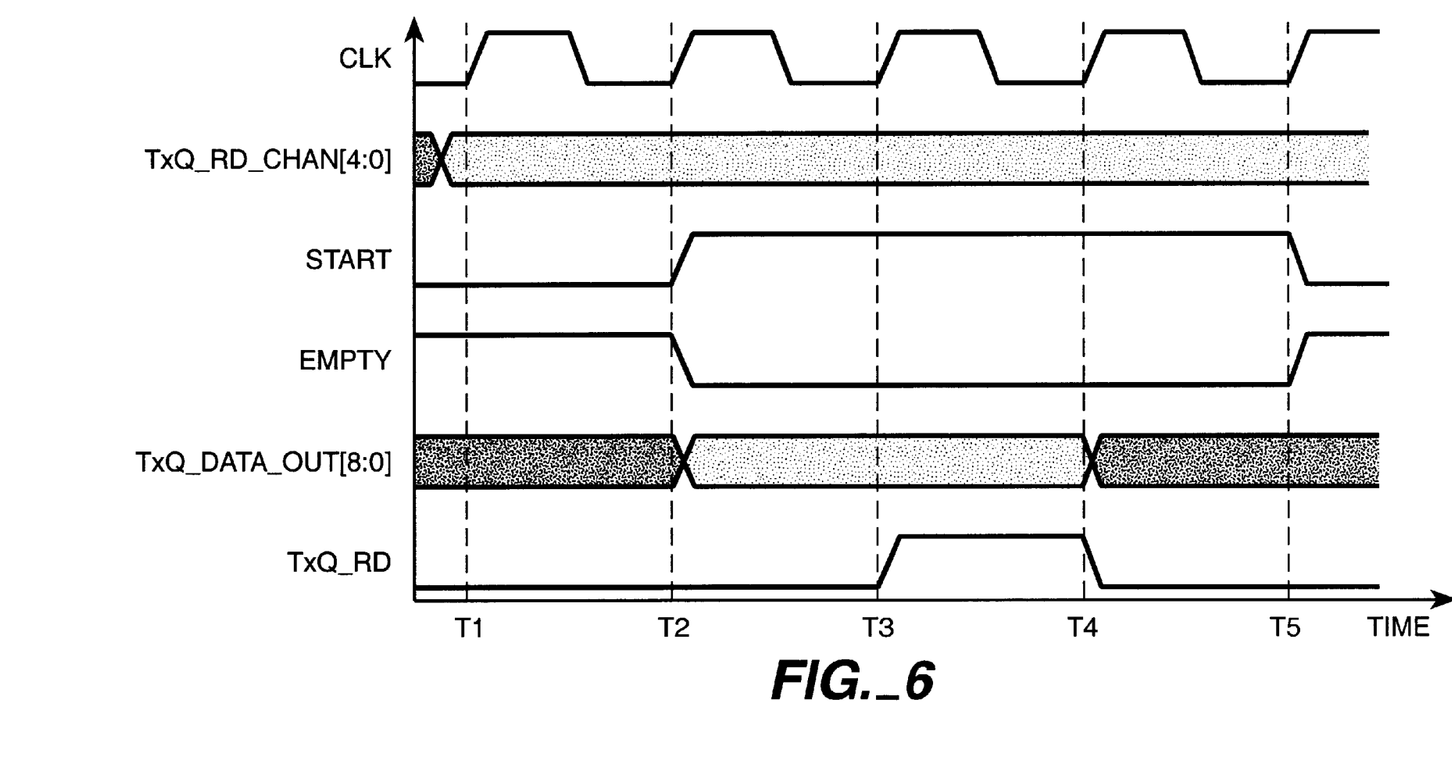
FIG. 6 is a waveform diagram illustrating various waveforms in the transmit FIFO shown in FIG. 3 over time.

FIG. 6 is a waveform diagram illustrating various signals in transmit FIFO 16 over time. Clock signal CLK represents a system clock which is used by transmit FIFO 16 to synchronize the write and read operations. At time T1, core logic 14 (or one of the data interface controllers 72) changes the read channel number TxQ_RD_CHAN[4:0]. At the next rising edge of CLK, at time T2, RAM 100 applies to corresponding data byte to TxQ_DATA_OUT[8:0] and the transmit queue status flags (such as the START and EMPTY flags) become valid. At time T3, core logic 14 (or one of the data interface controllers 72) asserts TxQ_RD and captures the data on TxQ_DATA_OUT[8:0]. At time T4, core logic 14 (or one of the data interface controllers 72) deasserts TxQ_RD, and the read pointer for the channel identified by TxQ_RD_CHAN[4:0] is incremented by one causing the data on TxQ_DATA_OUT[8:0] to change. At time T5, the transmit queue status flags for the selected channel are updated to reflect the read pointer change.

Figure 7:
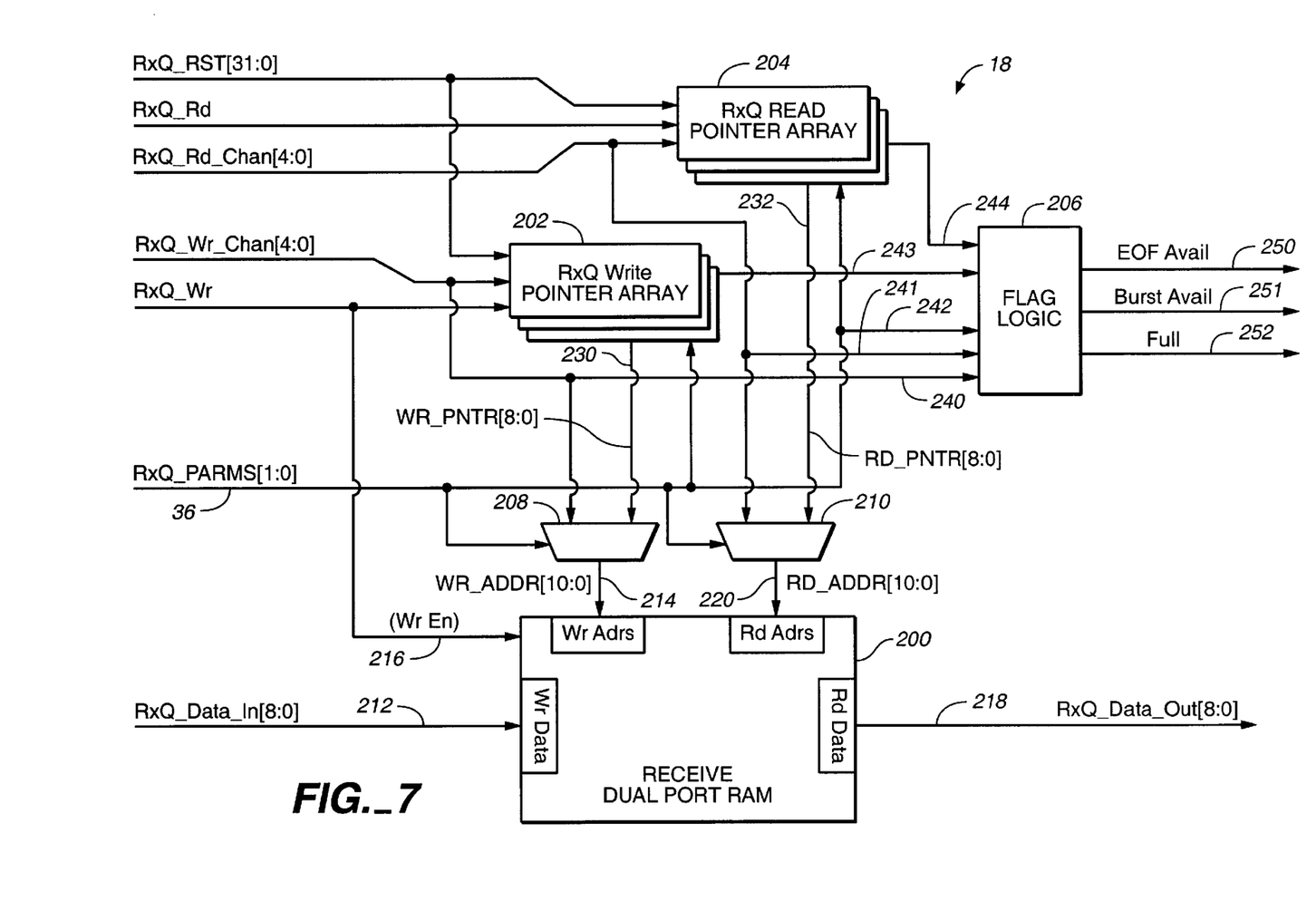
FIG. 7 is a block diagram of a receive FIFO within the data communication circuits shown in FIGS. 1 and 2.

FIG. 7 is a block diagram which illustrates receive FIFO 18 in greater detail. Receive FIFO 18 is substantially similar to transmit FIFO 16. Receive FIFO 18 includes dual port RAM 200, write pointer array 202, read pointer array 204, flag logic 206 and address multiplexers 208 and 210. RAM 200 includes a write data input 212, a write address input 214, a write enable input 216, a read data output 218 and a read address input 220. Data input 212 is coupled to receive data input RxQ_DATA_IN[8:0] for receiving successive 8-bit data words and a one-bit end of frame (EOF) flag from the receiving device, such as core logic 14 shown in FIG. 1 or one of the data interface controllers 72 shown in FIG. 2. The designation "RxQ" indicates the signal is a receive queue signal. Bit 8 is the EOF flag. The receiving device asserts bit 8 to a logic high level when the data on bits 7–0 contain the last byte of a receive data frame.

Write enable input 216 is coupled to receive queue write enable input RxQ_WR which is also provided by the receiving device. The receiving device asserts this input to a logic high level when the receiving device writes a data word to RAM 200. An absolute write address is applied to write address input 214 by multiplexer 208. When the receiving device asserts RxQ_WR, RAM 200 captures the data provided on RxQ_DATA_IN[8:0] and stores the data in the address location identified by the write address applied to write address input 214.

Read data output 218 is coupled to RxQ_DATA_OUT [8:0] for providing successive 8-bit data words and the corresponding EOF flag to DMA controller 20 (shown in FIG. 1). An absolute read address is applied to read address input 220 by multiplexer 210. RAM 200 applies the data stored in the address location identified by the read address to read data output 218.

Write pointer array 202 and multiplexer 208 generate the write addresses for RAM 200 based on a receive queue write enable signal RXQ_WR and a receive queue write channel input RxQ_WR_CHAN[4:0] provided by logic core 14 (or one of the data interface controllers 72) and a receive queue parameter signal RxQ_PARMS[1:0] provided by processor 22 on input 36. Read pointer array 204 and multiplexer 210 generate the read addresses for RAM 200 based on a receive queue read enable signal RXQ_RD and a receive queue read channel input RxQ_RD_CHAN[4:0] provided by DMA controller 20 and the receive queue parameter signal RxQ_PARMS[1:0] provided by processor 22 on input 36.

Write pointer array 202 maintains a write address pointer for each logical channel within RAM 200. Similarly, read pointer array 204 maintains a read pointer for each logical channel in RAM 200. Write pointer array 202 is coupled to reset input RxQ_RST[31:0], receive queue write channel input RxQ_WR_CHAN[4:0] and receive queue write enable input RXQ_WR. Each write pointer maintained by write pointer array 202 points to the address of the next entry to be written into the respective queue within RAM 200 for that logical channel. Write pointer array 202 has a write pointer output 230 which is coupled to address multiplexer 208 and to flag logic 206.

To write an entry into RAM 200, the receiving device provides a channel number on RxQ_WR_CHAN[4:0] and provides a pulse on RxQ_WR. Write pointer array 202 selects one of the write pointers based on the channel number received on RxQ_WR_CHAN[4:0] and applies that write pointer to write pointer output 230 as WR_PNTR [8:0]. As in transmit FIFO 16, multiplexer 208 combines selected bits of the write pointer applied to write pointer output 230 with selected bits of the channel number provided on RxQ_WR_CHAN[4:0] to form the absolute write address WR_ADDR[10:0] for RAM 200. When the receiving device activates RXQ_WR, RAM 200 captures the data provided on RxQ_DATA_IN[8:0] and stores the captured data in the address location identified by the absolute write address applied to write address input 214. Write pointer array 202 then increments the selected write pointer by one at the end of the write cycle.

Similarly, read pointer array 204 maintains a read pointer for each logical channel. Each read pointer points to the address of the next entry to be read from the respective queue within RAM 200 for that logical channel. To read an entry from one of the logical channels in RAM 200, DMA controller provides the selected channel number to be read on RxQ_RD_CHAN[4:0] and asserts RxQ_RD to a logic high state. Read pointer array 204 selects one of the read pointers based on the channel number provided on RxQ_RD_CHAN[4:0] and applies that read pointer to read pointer output 232 as RD_PNTR[8:0]. Multiplexer 210 combines selected bits of RD_PNTR[8:0] with selected bits of the channel number RxQ_RD_CHAN[4:0] to form the absolute read address RD_ADDR[10:0] for RAM 200. RAM 200 applies the data stored in the address location identified by RD_ADDR[10:0] to read data output 218. When DMA controller 20 has captured the data on RXQ_DATA_OUT [8:0], DMA controller 20 deactivates RxQ_RD. Read pointer array 204 then increments the selected read pointer at the end of the read cycle.

The receive queue parameter signal RxQ_PARMS[1:0] is provided by processor 22. Processor 22 can vary the number and size of the logical channels within RAM 200 and addressed by pointer arrays 102 and 104 by varying the logical pattern formed by RXQ_PARMS[1:0]. Write pointer array 202 and read pointer array 204 use RxQ_PARMS[1:0] to select how many write and read pointers will be maintained and to select the number of address bits required to index through the selected number of bytes per channel.

RxQ_PARMS[1:0] is also coupled to the select inputs of multiplexers 208 and 210. Multiplexers 208 and 210 operate substantially the same as multiplexers 108 and 110 shown in FIG. 3 and described with reference to FIGS. 4 and 5 to combine selected bits of the write and read pointers with selected bits of the write and read channel numbers to form the absolute write and read addresses for RAM 200. Multiplexers 208 and 210 thus allow the number of channels and the number of storage locations per channel to be programmable through queue parameter input RxQ_PARMS[1:0].

Flag logic 206 is similar to flag logic 106 and is shared among all logical channels maintained by receive FIFO 18. Flag logic 206 includes a write channel input 240 which is coupled to RxQ_WR_CHAN[4:0], a read channel input 241 which is coupled to RxQ_RD_CHAN[4:0], a parameter input 242 which is coupled to RXQ_PARMS[1:0], a write pointer input 243 which is coupled to write pointer array 202 and a read pointer input 244 which is coupled to read pointer array 204.

Flag logic 206 generates an "EOF AVAIL" flag on output 250 which is provided to DMA controller 20. Flag logic 106 asserts the EOF AVAIL flag to a logic high level to inform DMA controller 20 that the queue in RAM 200 contains the end of a data frame.

Flag logic 206 generates a "BURST AVAIL" flag on output 251. Flag logic 206 asserts this flag to a logic high level to inform DMA controller 20 that the receive queue for the currently selected channel has 33 or more bytes, for example, such that DMA controller can read a burst of bytes from the receive queue.

Flag logic 206 generates a "FULL" flag on output 252. Flag logic 206 asserts the FULL flag to inform core logic 14 (or one of the data communication controllers 72) that the queue in RAM 200 for the selected channel is full and cannot accept data.

Receive queue reset input RxQ_RST[31:0] is coupled to write pointer array 202 and read pointer array 204. There is one bit in RxQ_RST[31:0] for each logical channel in receive FIFO 16. Bit 0 corresponds to channel 0, bit 1 corresponds to channel 1, and so on. Core logic 14 (or the data interface controllers 72) set a corresponding bit in RxQ_RST[31:0] to a logic high level when it is resetting a channel or when the channel has not been enabled or activated by processor 22. The reset bit can also be used to flush one or more of the receive queues when a DMA controller error occurs.

The data communication circuit of the present invention uses a single, shared FIFO device for all transmit channels and a single, shared FIFO device for all receive channels. As a result, the transmit and receive FIFOs consume less area on the integrated circuit. All channels share the same address decode logic that is required for writing into and reading from each FIFO queue. The shared logic requires fewer gates and less routing than circuits requiring separate address decode logic for each channel. Each logical channel also shares the same queue status flag logic for writing into and reading from the FIFO. Again, this results in fewer gates and less routing. Further, since all logical channels share the same FIFO device on the integrated circuit, less routing is required to interconnect the transmit FIFO and the receive FIFO to their respective sources and destinations.

The data communication circuit of the present invention also provides a queuing parameter input to the transmit and receive FIFOs which allows the FIFOs to be partitioned differently for implementing different numbers of channels. This allows the user to re-size the queues to suit a particular application. The multiple channel data communication buffer of the present invention is particularly beneficial for use in telecommunication and network device applications.

Although the present invention has been described with reference to preferred embodiments, workers skilled in the art will recognize that changes may be made in form and detail without departing from the spirit and scope of the invention. For example, RAMs 100 and 200 can include synchronous or asynchronous RAMs, and can be dual or single ported. The queue status flags discussed above are defined for a specific application. Other queue status flags can be added, deleted or redefined for any particular application. Also, the example discussed above uses a maximum number of 32 channels. Again, for any particular application, the number of selectable channels in the transmit and receive FIFOs can vary. Also, the depth of each queue can be changed for any particular application. The terms "active", "inactive", "asserted" and "deasserted" are arbitrary, interchangeable terms which can refer to logic high states or logic low states. The term "coupled" can include a direct connection or a connection through one or more additional elements. Other changes can also be made.

What is claimed is:

1. A multiple-channel data communication buffer comprising a transmit first-in-first-out ("FIFO") circuit and a receive FIFO circuit, wherein the transmit and receive FIFO circuits each comprise:

a single memory device having a data input, a data output, a write address input, a read address input and a plurality of logical channels from the data input to the data output;

a write channel number input which identifies a selected one of the plurality of logical channels;

a read channel number input which identifies a selected one of the plurality of logical channels;

a write pointer array coupled to the write channel number input and comprising a write pointer for each of the logical channels, wherein the write pointer array applies a selected one of the write pointers to the write address input based on the write channel number input; and a read pointer array coupled to the read channel number input and comprising a read pointer for each of the logical channels, wherein the read pointer array applies a selected one of the read pointers to the read address input based on the read channel number input.

2. The multiple channel data communication buffer of claim 1 wherein the single memory device comprises a dual port memory.

3. The multiple channel data communication buffer of claim 1 wherein the transmit and receive FIFOs each further comprise:

a queue parameter input for receiving a memory partition control signal; and the number of logical channels through the single memory device of each logical channel is selectable by the memory partition control signal.

4. The multiple channel data. Communication buffer of claim 3 wherein:

the write pointer array is coupled to the queue parameter input and the number of write pointers in the write pointer array is selectable by the memory partition control signal; and the read pointer array is coupled to the queue parameter input and the number of read pointers in the read pointer array is selectable by the memory partition control signal.

5. The multiple channel data communication buffer of claim 1 wherein:

the write address input comprises a first address field which is coupled to the selected write pointer and a second address field which is coupled to the write channel number input; and the read address input comprises a third address field which is coupled to the selected read pointer and a fourth address field which is coupled to the read channel number input.

6. The multiple channel data communication buffer of claim 5 wherein the write and read channel number inputs and the write and read pointers have multiple bits and wherein the transmit and receive FIFOs each further comprise:

a queue parameter input for receiving a memory partition control signal;

a first multiplexer circuit which couples selected bits of the selected write pointer to the first address field and selected bits of the write channel number input to the second address field based on the partition control signal; and a second multiplexer circuit which couples selected bits of the selected read pointer to the third address field and selected bits of the read channel number input to the fourth address field based on the partition control signal.

7. The multiple channel data communication buffer of claim 1 wherein the transmit and receive FIFOs each further comprise:

a flag generator which is shared among the plurality of logical channels and is coupled to the write pointer array and the read pointer array, wherein the flag generator generates a status flag output which is based on a comparison of the write pointer and the read pointer for the logical channel that is identified by the write channel number input.

8. The multiple channel data communication buffer of claim 1 wherein the transmit and receive FIFOs each further comprise:

a flag generator which is shared among the plurality of logical channels and is coupled to the write pointer array and the read pointer array, wherein the flag generator generates a status flag output which is based on a comparison of the write pointer and the read pointer for the logical channel that is identified by the read channel number input.

9. A multiple-channel data communication buffer comprising:

a memory which is partitioned into a plurality of transmit queue memory locations and a plurality of receive queue memory locations;

a queue parameter input for receiving a memory partition control signal;

a transmit first-in-first-out ("FIFO") circuit which is coupled to the queue parameter input and which comprises a transmit data input, a transmit data output and a plurality of logical channels, which are arranged in parallel with one another between the transmit data input and the transmit data output, wherein each of the parallel logical channels in the transmit FIFO circuit comprises respective ones of the transmit queue memory locations and wherein the number of parallel logical channels in the transmit FIFO circuit and the number of respective transmit queue memory locations in each logical channel of the transmit FIFO circuit are selectable through the queue parameter input; and a receive FIFO circuit which is coupled to the queue parameter input and which comprises a receive data input, a receive data output and a plurality of logical channels, which are arranged in parallel with one another between the receive data input and the receive data output, wherein each of the parallel logical channels in the receive FIFO circuit comprises respective ones of the receive queue memory locations and wherein the number of logical channels in the receive FIFO circuit and the number of respective receive queue memory locations in each logical channel of the receive FIFO circuit are selectable through the queue parameter input.

10. A multiple-channel data communication buffer comprising:

a transmit first-in-first-out ("FIFO") circuit which comprises a transmit data input, a transmit data output and a plurality of logical channels, which are arranged in parallel with one another between the transmit data input and the transmit data output;

means for writing transmit data to and reading the transmit data from each of the plurality of logical channels in the transmit FIFO circuit;

a receive FIFO circuit which comprises a receive data input, a receive data output and a plurality of logical channels, which are arranged in parallel with one another between the receive data input and the receive data output;

means for writing receive data to and reading the receive data from each of the plurality of logical channels in the receive FIFO circuit; and means for varying the number of the logical channels in the transmit FIFO and the receive FIFO.

* * * * *